United States Patent
Ha

(10) Patent No.: US 9,766,647 B2
(45) Date of Patent: Sep. 19, 2017

(54) CLOCK CIRCUIT FOR GENERATING CLOCK SIGNAL AND SEMICONDUCTOR INTEGRATED CIRCUIT DEVICE INCLUDING THE SAME

(71) Applicant: Samsung Electronics Co., Ltd., Suwon-si, Gyeonggi-do (KR)

(72) Inventor: Suk Won Ha, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 46 days.

(21) Appl. No.: 14/920,124

(22) Filed: Oct. 22, 2015

(65) Prior Publication Data
US 2016/0116934 A1   Apr. 28, 2016

(30) Foreign Application Priority Data

Oct. 23, 2014 (KR) .................. 10-2014-0144239

(51) Int. Cl.
*G06F 1/04* (2006.01)
*G06F 1/32* (2006.01)

(52) U.S. Cl.
CPC .............. *G06F 1/04* (2013.01); *G06F 1/3203* (2013.01); *G06F 1/3287* (2013.01)

(58) Field of Classification Search
CPC ....................................................... G06F 1/04
See application file for complete search history.

(56) References Cited

U.S. PATENT DOCUMENTS

| | | | |
|---|---|---|---|
| 5,684,418 A | 11/1997 | Yanagiuchi | |
| 6,844,765 B2 | 1/2005 | Sasaki | |
| 7,113,009 B2 | 9/2006 | Sun et al. | |
| 7,315,957 B1 * | 1/2008 | Wagner | G06F 1/06 713/500 |
| 7,913,103 B2 | 3/2011 | Gold et al. | |
| 8,049,546 B2 | 11/2011 | Oh | |
| 8,248,118 B2 | 8/2012 | Subburaj et al. | |
| 8,466,723 B2 * | 6/2013 | Klapproth | G06F 1/08 327/144 |
| 8,593,185 B2 | 11/2013 | Kume | |
| 2007/0041487 A1 | 2/2007 | Khanoyan | |
| 2014/0009192 A1 | 1/2014 | Suzuki | |

FOREIGN PATENT DOCUMENTS

| | | |
|---|---|---|
| JP | 06104715 A | 4/1994 |
| JP | 2006157849 A | 6/2006 |

\* cited by examiner

*Primary Examiner* — Hai L Nguyen
(74) *Attorney, Agent, or Firm* — Harness, Dickey & Pierce, P.L.C.

(57) ABSTRACT

A clock circuit for generating a clock signal includes a first clock generator configured to generate a first clock signal, a second clock generator configured to generate a second clock signal, and a selector connected to the first clock generator and the second clock generator. The selector is configured to select one of the first and second clock signals as a selected clock signal based on a selection signal. The selector is configured to transmit, if a selection of the selector changes from the second clock signal to the first clock signal, a turn-on request signal to at least one first component to enable the at least one first component. The at least one first component is configured to send a turn-on acknowledgement signal to the selector in response to the turn-on request signal. The first clock generator includes the at least one first component.

20 Claims, 12 Drawing Sheets

CLOCK CIRCUIT FOR GENERATING CLOCK SIGNAL AND SEMICONDUCTOR INTEGRATED CIRCUIT DEVICE INCLUDING THE SAME

CROSS-REFERENCE TO RELATED APPLICATIONS

This application claims priority under 35 U.S.C. §119(a) from Korean Patent Application No. 10-2014-0144239 filed on Oct. 23, 2014, the disclosure of which is hereby incorporated by reference in its entirety.

BACKGROUND

At least one example embodiment of the inventive concepts relates to a clock circuit for generating a clock signal and/or a semiconductor integrated circuit (IC) device (e.g., a system on chip) including the same.

A semiconductor IC such as a system-on-chip (SoC), a processor, or a memory device operates according to a clock signal. The clock signal may need to have a variable frequency or it may be changed in some semiconductor ICs.

A clock circuit which generates and provides a clock signal includes various components such as a phase locked loop (PLL), a divider, a multiplexer, and clock gating logic. The clock circuit changes a division factor for a clock signal or changes a clock source in order to provide a different clock signal.

SUMMARY

According to at least one example embodiment of the inventive concepts, a clock circuit for generating a clock signal includes a first clock generator configured to generate a first clock signal, a second clock generator configured to generate a second clock signal, and a selector connected to the first clock generator and the second clock generator. The selector is configured to select one of the first and second clock signals as a selected clock signal based on a selection signal. The selector is configured to transmit, if a selection of the selector changes from the second clock signal to the first clock signal, a turn-on request signal to at least one first component to enable the at least one first component. The at least one first component is configured to send a turn-on acknowledgement signal to the selector in response to the turn-on request signal. The first clock generator includes the at least one first component.

According to at least one example embodiment of the inventive concepts, the selector is configured to transmit a turn-off request signal to at least one second component to disable the at least one second component and to send a turn-off acknowledgement signal to the selector. The second clock generator includes the at least one second component.

According to at least one example embodiment of the inventive concepts, the at least one first component includes a first clock component configured to receive a first input clock signal and to transmit the first clock signal to the selector as the selected clock signal. The at least one first component includes a second clock component configured to receive a second input clock signal and to transmit the first clock signal to the first clock component.

According to at least one example embodiment of the inventive concepts, the first clock component is configured to transmit the turn-on request signal to the second clock component in response to the turn-on request signal from the selector to i) enable the second clock component, and ii) to cause the second clock component to transmit the turn-on acknowledgement signal to the first clock component. The first clock component is enabled in response to the turn-on acknowledgement signal from the second clock component and configured to transmit the turn-on acknowledgement signal to the selector.

According to at least one example embodiment of the inventive concepts, if a selection of the selector is changed from the first clock generator to the second clock generator, i) the selector is configured to transmit the turn-off request signal to the first clock component, ii) the first clock component is configured to transmit the turn-off request signal to the second clock component in response to the turn-off request signal from the selector, iii) the second clock component is disabled in response to the turn-off request signal from the first clock component and configured to send the turn-off acknowledgement signal to the first clock component, and iv) the first clock component is disabled in response to the turn-off acknowledgement signal from the second clock component and configured to transmit the turn-off acknowledgement signal to the selector.

According to at least one example embodiment of the inventive concepts, the at least one second component includes a first clock component configured to receive a third input clock signal and to transmit the second clock signal to the selector as the selected clock signal. The at least one second component includes a second clock component configured to receive a fourth input clock signal and to transmit the third clock signal to the first clock component. The first clock component is configured to transmit the turn-off request signal to the second clock component in response to the turn-off request signal from the selector. The second clock component is disabled in response to the turn-off request signal from the first clock component and is configured to send the turn-off acknowledgement signal to the first clock component. The first clock component is disabled in response to the turn-off acknowledgement signal from the second clock component and configured to transmit the turn-off acknowledgement signal to the selector.

According to at least one example embodiment of the inventive concepts, each of the first and second clock components comprises a state register configured to store state information of an associated clock component.

According to at least one example embodiment of the inventive concepts, the first clock component is configured to not transmit the turn-on request signal to the second clock component and transmit the turn-on acknowledgement signal to the selector if i) state information of a state register comprised in the first clock component indicates a turn-on state, and ii) the first clock component receives the turn-on request signal from the selector. The first clock component is configured to transmit the turn-on request signal to the second clock component if i) the state information of the state register indicates a turn-off state, and ii) the first clock component receives the turn-on request signal from the selector. The second clock component is enabled in response to the turn-on request signal from the first clock component of the first clock generator, configured store the turn-on state as the state information of a respective state register, and configured to transmit the turn-on acknowledgement signal to the first clock component of the first clock generator. The first clock component is enabled in response to the turn-on acknowledgement signal from the second clock component, configured to store the turn-on state as the state information of a respective state register, and configured to transmit the turn-on acknowledgement signal to the selector.

According to at least one example embodiment of the inventive concepts, each of the first and second clock components includes a first port configured to receive the turn-on request signal and the turn-off request signal, and a second port configured to receive the turn-on acknowledgement signal and the turn-off acknowledgement signal.

According to at least one example embodiment of the inventive concepts, each of the first and second clock components includes a first port and a second port configured to receive the turn-on request signal and the turn-off request signal, respectively. Each of the first and second clock components includes a third port and a fourth port configured to receive the turn-on acknowledgement signal and the turn-off acknowledgement signal, respectively.

According to at least one example embodiment of the inventive concepts, the first clock component comprises a parameter setting register and a value set in the parameter setting register is applied if the first clock component is turned on.

According to at least one example embodiment of the inventive concepts, a semiconductor integrated circuit device includes a clock circuit configured to receive a source clock signal and to generate an output clock signal, and a logic circuit configured to operate in response to the output clock signal. The clock circuit includes a first clock generator configured to generate a first clock signal, a second clock generator configured to generate a second clock signal, and a selector connected to the first clock generator and the second clock generator. The selector is configured to select one of the first clock signal and the second clock signal as the output clock signal based on a selection signal. The selector is configured to transmit, if a selection of the selector changes from the second clock signal to the first clock signal, a turn-on request signal to at least one clock component of the first clock generator to enable the first clock generator, and a turn-off request signal to at least one clock component of the second clock generator to disable the second clock generator.

According to at least one example embodiment of the inventive concepts, the at least one clock component of the first clock generator is configured to receive the turn-on request signal from a clock component at a lower node and transmit the turn-on request signal to a clock component at a higher node.

According to at least one example embodiment of the inventive concepts, the at least one clock component of the second clock generator is configured to receive the turn-off request signal from a clock component at a lower node and transmit the turn-off request signal to a clock component at a higher node.

According to at least one example embodiment of the inventive concepts, each of the at least one clock components in each of the first and second clock generators comprises a state register configured to store state information of an associated clock component.

According to at least one example embodiment of the inventive concepts, a clock circuit includes a selector configured to send a first request signal and a second request signal, the first request signal requesting activation of first clock components associated with a selected clock generator, and the second request signal requesting deactivation of second clock components associated with an unselected clock generator. The selector is configured to receive a first acknowledgement signal and a second acknowledgement signal, the first acknowledgement signal verifying activation of the first clock components, and the second acknowledgement signal verifying deactivation of the second clock components.

According to at least one example embodiment of the inventive concepts, the selector is configured to send the first and second request signals in response to receiving a request to change clock signals.

According to at least one example embodiment of the inventive concepts, the selector includes a first port configured to send the first and second request signals, a second port configured to receive the first and second acknowledgement signals, and a third port configured to output a clock signal generated by the selected clock generator.

According to at least one example embodiment of the inventive concepts, the selector is configured to send the request signals at a substantially same time.

According to at least one example embodiment of the inventive concepts, the selector is configured to receive the first acknowledgement signal after the first request signal reaches a clock component at a highest node in the first clock components, and receive the second acknowledgement signal after the second request signal reaches a clock component at a highest node in the second clock components.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF EXAMPLE EMBODIMENTS

Figure 1:
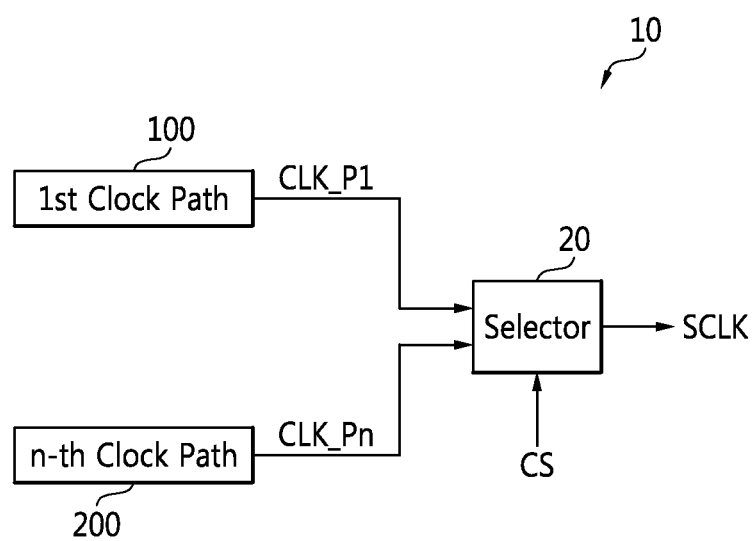
FIG. 1 is a schematic block diagram of a clock circuit according to at least one example embodiment of the inventive concepts.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

A system-on-chip (SoC) or a clock system includes various clock components such as a phase locked loop (PLL) circuit, a divider, a multiplexer, and clock gating logic. In order to change the setting of the multiplexer, i.e., to change a clock signal selected in a conventional clock system, all clock components in a clock path to be changed need to be individually controlled. For instance, all clock components in a newly selected clock path need to be individually turned on and then selection needs to be changed in the multiplexer. In addition, after the selection of the multiplexer is changed, clock components not used in the clock path need to be individually turned off in order to reduce power consumption.

As described above, the conventional clock system is inconvenient for a user because the user individually controls all clock components in a clock path to be used taking the entire clock path into account.

FIG. 1 is a schematic block diagram of a clock circuit 10 according to at least one example embodiment of the inventive concepts. The clock circuit 10 includes first through n-th (where "n" is an integer of at least 2) clock paths (or clock generator) 100 through 200 and a selector 20.

The first clock path (or clock generator) 100 generates a first clock signal CLK_P1 and the n-th clock path (or clock generator) 200 generates an n-th clock signal CLK_Pn. The selector 20 is connected to the first through n-th clock paths 100 through 200 and outputs a selection clock signal SCLK received from a clock path selected from among the first through n-th clock paths 100 through 200. For instance, the selector 20 selects one among the first through n-th clock signals CLK_P1 through CLK_Pn in response to a selection control signal CS and outputs the selected one as the selection clock signal SCLK.

Each of the clock paths 100 through 200 includes one or more clock components such as a phase locked loop (PLL) circuit, a divider, a multiplexer, and a clock gating logic. For clarity of the description, it is assumed that "n" is 2 and the selector 20 has selected the second clock signal $CLK_{13}P2$, i.e., the second clock path 200 in response to the selection control signal CS.

In order to change from the second clock signal CLK_P2 to the first clock signal CLK_P1, the first clock path 100 is selected by the selector 20 in response to the selection control signal CS in a state where the second clock path 200 has been selected, the selector 20 transmits a turn-on request signal to at least one of the clock components included in the first clock path 100 to turn on or enable the first clock path 100. In addition, the selector 20 transmits a turn-off request signal to at least one of clock components included in the second clock path 200 to turn off or disable the second clock path 200.

The at least one component included in the first clock path 100 is turned on or enabled in response to the turn-on request signal from the selector 20 and transmits a turn-on acknowledgement signal to the selector 20. The at least one component included in the second clock path 200 is turned off or disabled in response to the turn-off request signal from the selector 20 and transmits a turn-off acknowledgement signal to the selector 20.

Figure 2:
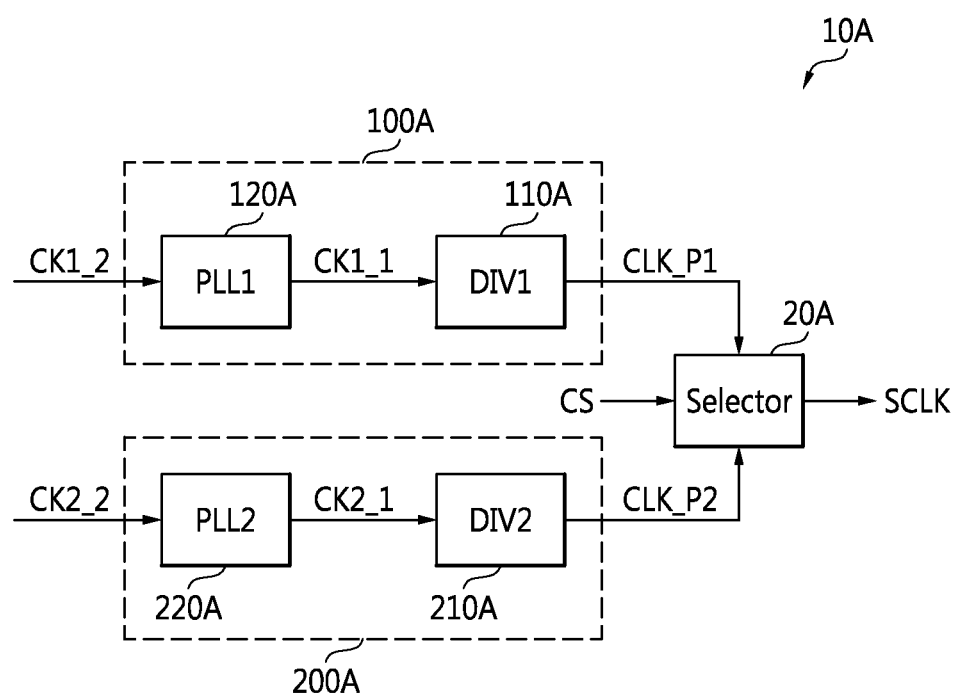
FIG. 2 is a detailed block diagram of an example of the clock circuit illustrated in FIG. 1.
Figure 3:
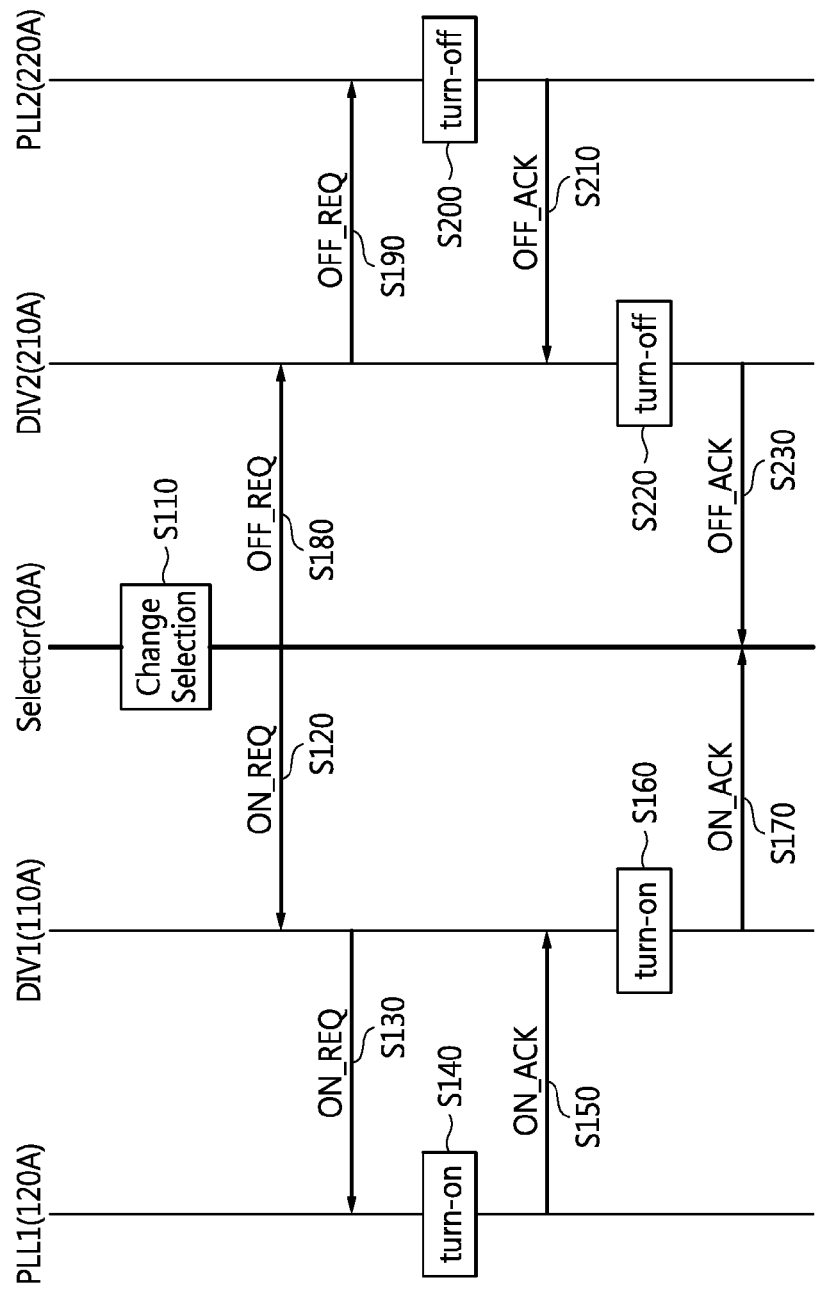
FIG. 3 is a schematic flowchart of an operation of a clock circuit illustrated in FIG. 2.

FIG. 2 is a detailed block diagram of an example 10A of the clock circuit 10 illustrated in FIG. 1. FIG. 3 is a schematic flowchart of an operation of the clock circuit 10A illustrated in FIG. 2.

Referring to FIGS. 2 and 3, a first clock path (or clock generator) 100A includes a first clock component 110A and a second clock component 120A. The first clock component 110A of the first clock path 100A receives a first input clock signal CK1_1 and outputs the first clock signal CLK_P1 to a selector 20A. The second clock component 120A of the first clock path 100A receives a second input clock signal $CK1_{13}2$ and outputs the first input clock signal CK1_1 to the first clock component 110A of the first clock path 100A.

A second clock path (or clock generator) 200A includes a first clock component 210A and a second clock component 220A. The first clock component 210A of the second clock path 200A receives a third input clock signal CK2_1 and outputs the second clock signal CLK_P2 to the selector 20A. The second clock component 220A of the second clock path 200A receives a fourth input clock signal CK2_2 and outputs the third input clock signal CK2_1 to the first clock component 210A of the second clock path 200A.

The first clock components 110A and 210A included in the first and second clock paths 100A and 200A may be dividers. The second clock components 120A and 220A included in the first and second clock paths 100A and 200A may be phase locked loop circuits (PLLs), but the inventive concepts are not restricted thereto. Although each of the first and second clock paths 100A and 200A include two clock components, the number of clock components and connections thereof may be modified.

It is assumed that the selector 20A is initially set to select the second clock signal $CLK_{13}$ P2, that is, the second clock signal CLK_P2 is initially selected in response to the selection control signal CS. According to the initial setting of the selector 20A, the first and second clock components 210A and 220A of the second clock path 200A have been turned on and the first and second clock components 110A and 120A of the first clock path 100A have been turned off.

The operation of the clock circuit 10A performed when the setting of the selector 20A is changed to select the first clock signal CLK_P1 by changing the selection control signal CS, that is, when the setting is changed to select the first clock path 100A will be described with reference to FIG. 3 below.

When the setting is changed to select the first clock signal CLK_P1 in the selector 20A in operation S110, the selector 20A transmits a turn-on request signal ON_REQ for turning on the first clock path 100A to the first clock component 110A of the first clock path 100A in operation S120. The first clock component 110A of the first clock path 100A transmits the turn-on request signal ON_REQ to the second clock component 120A of the first clock path 100A in response to the turn-on request signal ON_REQ received from the selector 20A in operation S130.

The second clock component 120A of the first clock path 100A is turned on or enabled in response to the turn-on request signal ON_REQ received from the first clock component 110A of the first clock path 100A in operation S140, and transmits a turn-on acknowledgement signal ON_ACK indicating that turn-on has been completed to the first clock component 110A of the first clock path 100A in operation S150. The first clock component 110A of the first clock path 100A is turned on or enabled in response to the turn-on acknowledgement signal ON_ACK from the second clock component 120A of the first clock path 100A in operation S160, and transmits the turn-on acknowledgement signal ON_ACK to the selector 20A in operation S170. Alternatively, the first clock component 110A of the first clock path 100A may be turned on or enabled in response to the turn-on request signal ON_REQ from the selector 20A.

Meanwhile, when the setting of the selector 20A is changed to select the first clock path 100A, the selector 20A transmits a turn-off request signal OFF_REQ for turning off an old clock path, i.e., the second clock path 200A to the first clock component 210A of the second clock path 200A in operation S180. Operation S180 may occur at a substantially same time as operation S120.

The first clock component 210A of the second clock path 200A transmits the turn-off request signal OFF_REQ to the second clock component 220A of the second clock path 200A in response to the turn-off request signal OFF_REQ received from the selector 20A in operation S190. The second clock component 220A of the second clock path 200A is turned off or disabled in response to the turn-off request signal OFF_REQ received from the first clock component 210A of the second clock path 200A in operation S200, and transmits a turn-off acknowledgement signal OFF_ACK indicating that turn-off has been completed to the first clock component 210A of the second clock path 200A in operation S210.

The first clock component 210A of the second clock path 200A is turned off or disabled in response to the turn-off acknowledgement signal OFF_ACK received from the second clock component 220A of the second clock path 200A in operation S220, and transmits the turn-off acknowledgement signal OFF_ACK to the selector 20A in operation S230.

As described above, when the selection of the selector 20A is changed, the selector 20A transmits a request signal (i.e., the turn-on request signal ON_REQ or the turn-off request signal OFF_REQ) to only a clock component directly connected to the selector 20A, i.e., only a clock component at the lowest node in a clock path. Then, the clock component receiving the request signal from the selector 20A transmits the request signal to the next higher clock component. In such manner, the request signal is sequentially transmitted up to the highest clock component. The clock component at the highest node transmits an acknowledgement signal to a clock component at a lower node. The clock component that has received the acknowledgement signal transmits the acknowledgement signal to a clock component at the next lower node. In such manner, the acknowledgement signal is sequentially transmitted to the selector 20A. In view of the above, it should be understood that the selector 20A may receive the turn-on acknowledgement signal ON_ACK after the turn-on request signal ON_REQ reaches a clock component at a highest node in the first clock path 100A. Further, the selector 20A may receive the acknowledgement signal OFF_ACK after the request signal OFF_REQ reaches a clock component at a highest node in the second clock path 200A.

Here, the lowest node is a node that is closest to the selector 20A among clock components in a clock path from a clock source to the selector 20A, i.e., a node (110A or 210 in example embodiments illustrated in FIG. 2) directly connected to the selector 20A. The highest node is a node that is farthest from the selector 20A, i.e., a node (120A or 220A in the embodiments illustrated in FIG. 2) that is closest to the clock source. Accordingly, a higher node is closer to the clock source than a lower node.

In a newly selected clock path, each clock component is turned on or enabled in response to the turn-on request signal ON_REQ or the turn-on acknowledgement signal ON_ACK. In an old clock path (i.e., an unselected clock path), each clock component is turned off or disabled in response to the turn-off request signal OFF_REQ or the turn-off acknowledgement signal OFF_ACK.

As described above, according to at least one example embodiment of the inventive concepts, when a clock signal is changed in a selector, that is, when a clock path is changed from one to another (e.g., from a first clock path to a second clock path); it is not necessary to individually control all clock components on each clock path. In other words, a user or manager does not need to manually control or set each of the clock components. Each clock component is automatically controlled or set by simply changing selection in the selector 20A.

Figure 4:
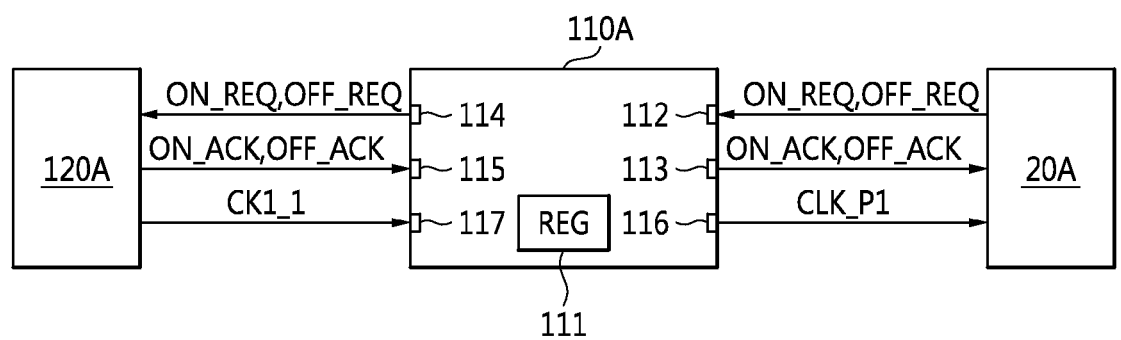
FIG. 4 is a block diagram of a first clock component in a first clock path illustrated in FIG. 2 according to at least one example embodiment of the inventive concepts.

FIG. 4 is a block diagram of the first clock component 110A of the first clock path 100A illustrated in FIG. 2 according to at least one example embodiment of the inventive concepts. Referring to FIG. 4, the first clock component 110A may include a state register 111 and a plurality of ports 112 through 117. The state register 111 stores state information (e.g., a turn-on state or a turn-off state) of the first clock component 110A.

The first port 112 is used to receive the turn-on request signal ON_REQ and the turn-off request signal OFF_REQ from a lower node, i.e., the selector 20A. The second port 113 is used to transmit the turn-on acknowledgement signal ON_ACK and the turn-off acknowledgement signal OFF_ACK to the selector 20A.

The third port 114 is used to transmit the turn-on request signal ON_REQ and the turn-off request signal OFF_REQ to a higher node, i.e., the second clock component 120A. The fourth port 115 is used to receive the turn-on acknowledgement signal ON_ACK and the turn-off acknowledgement signal OFF_ACK from the second clock component 120A.

In example embodiments illustrated in FIG. 4, the turn-on request signal ON_REQ and the turn-off request signal OFF_REQ are received through one common port and transmitted through another one common port. The turn-on request signal ON_REQ and the turn-off request signal OFF_REQ may be the same as or different from each other. When the turn-on request signal ON_REQ is the same as the turn-off request signal OFF_REQ, the turn-on request signal ON_REQ may be distinguished from the turn-off request signal OFF_REQ according to the state information stored in the state register 111. For instance, when a clock component receives a request signal in a state where the state information of the state register 111 indicates the turn-on state, the clock component may determine the request signal as the turn-off request signal OFF_REQ.

In at least one example embodiment, the turn-on request signal ON_REQ and the turn-off request signal OFF_REQ may be transmitted or received through different ports, respectively.

Although not shown, the first clock component 110A may also include a parameter setting register. The parameter setting register may set and change a parameter of the first clock component 110A. The parameter setting register may be formed with a special function register (SFR).

When the first clock component 110A is a divider, the parameter of the first clock component 110A may be a division factor, but the inventive concepts are not restricted to this example. When a value of the parameter setting register is changed, the parameter of the first clock component 110A may be changed. The changed value of the parameter setting register may be applied when the first clock component 110A is turned on.

Although only the first clock component 110A of the first clock path 100A is illustrated in FIG. 4, the first clock component 210A of the second clock path 200 may also be implemented in the same manner. However, clock components at the highest node, i.e., the second clock components 120A and 220A do not include third and fourth ports.

Two clock signals are input to the selector 20A as illustrated in FIGS. 3 and 4. However, three or more clock signals may be input to a selector in at least one other example embodiment. In this case, there may be a clock path that is not selected by a selector either before or currently.

The selector does not send a request signal to this clock path. For instance, when there are first through third clock paths that can be selected by the selector and a current clock path is changed from the first clock path to the second clock path by the change in the selection of the selector, the third clock path is the path that is not selected either before or currently. At this time, the selector transmits a turn-off request signal to the first clock path and a turn-on request signal to the second clock path but does not transmit any request signal to the third clock path.

Figure 5:
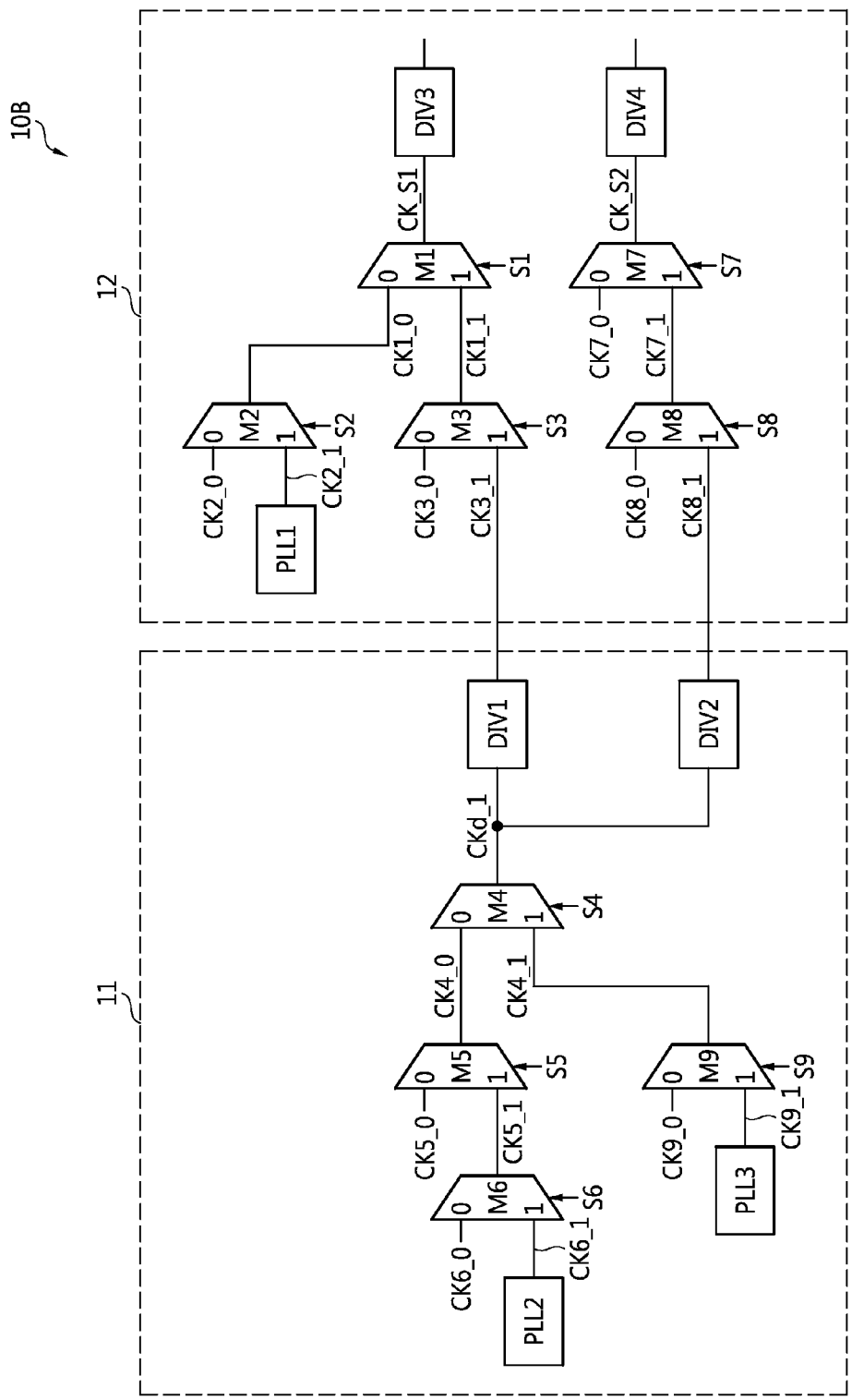
FIG. 5 is a block diagram of a clock circuit according to at least one example embodiment of the inventive concepts.

FIG. 5 is a block diagram of a clock circuit 10B according to at least one example embodiment of the inventive concepts. FIGS. 6 through 9 are schematic flowchart of an operation of the clock circuit 10B illustrated in FIG. 5.

Referring to FIG. 5, the clock circuit 10B may include first through ninth multiplexers M1 through M9, first through third PLLs PLL1 through PLL3, and first through fourth dividers DIV1 through DIV4. The clock circuit 10B may be implemented in two modules 11 and 12 in a distributed manner. Each of the modules 11 and 12 may be implemented as a part of a different function module (e.g., a processor, a codec, or a controller). However, the clock circuit 10B may be implemented in a single module or in three or more modules in a distributed manner in at least one other example embodiment.

It is assumed that the initial selection of the first multiplexer M1 is "0". In other words, it is assumed that an initial value of a selection signal S1 of the first multiplexer M1 is "0".

Figure 6:
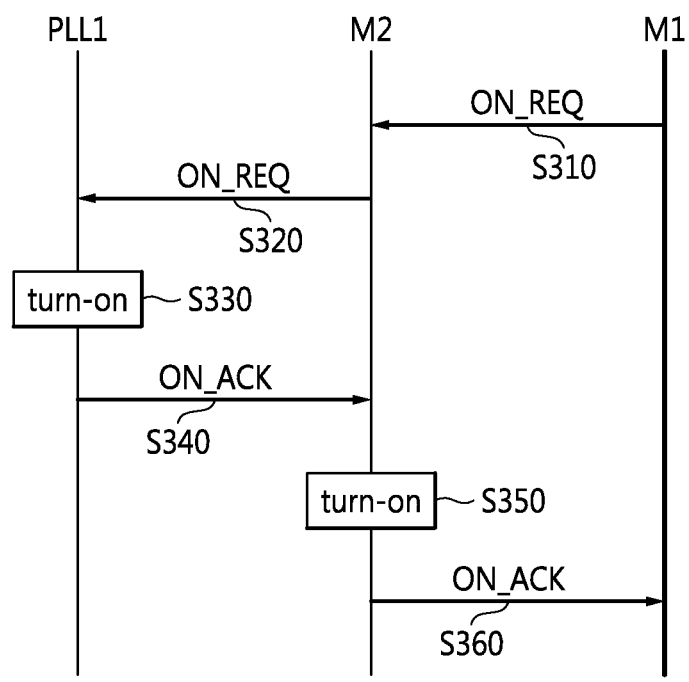
FIGS. 6 through 9 are schematic flowchart of an operation of the clock circuit illustrated in FIG. 5.

The operation of the clock circuit 10B in a case where the initial selection of the first multiplexer M1 is "0" will be described with reference to FIG. 6. Referring to FIGS. 5 and 6, when the clock circuit 10B is powered up, the first multiplexer M1 transmits the turn-on request signal ON_REQ to a higher node, i.e., the second multiplexer M2 to turn on clock components of a clock path selected according to the initial selection signal S1 of "0" in operation S310.

It is assumed that a selection signal S2 of the second multiplexer M2 is "1". At this time, the second multiplexer M2 transmits the turn-on request signal ON_REQ to a higher node, i.e., the first PLL PLL1 in operation S320. The first PLL PLL1 is turned on or enabled in response to the turn-on request signal ON_REQ in operation S330. When a set or changed value has been stored in a parameter setting register (not shown) of the first PLL PLL1, the value of the parameter setting register may be applied when the first PLL PLL1 is turned on or enabled. The first PLL PLL1 sends the turn-on acknowledgement signal ON_ACK to the lower node, i.e., the second multiplexer M2 in operation S340.

The second multiplexer M2 is turned on or enabled in response to the turn-on acknowledgement signal ON_ACK from the first PLL PLL1 in operation S350, and transmits the turn-on acknowledgement signal ON_ACK to the lower node, i.e., the first multiplexer M1 in operation S360.

Figure 7:
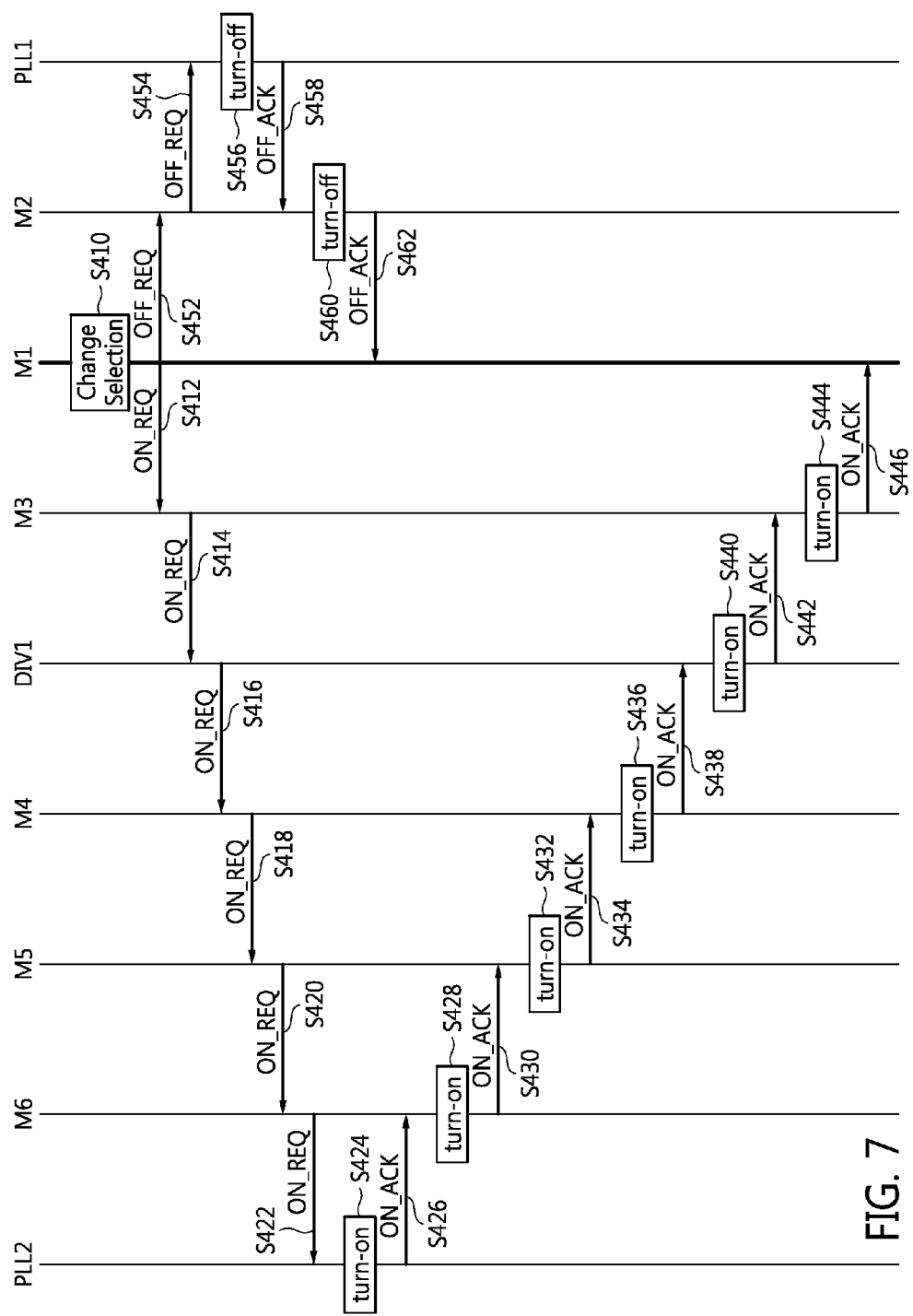

The operation of the clock circuit 10B in case where the setting of the first multiplexer M1 is changed from "0" to "1" is illustrated in FIG. 7. Referring to FIGS. 5 and 7, when the selection signal S1 of the first multiplexer M1 is changed from "0" to "1", the selection of the first multiplexer M1 is changed in operation S410.

When the selection of the first multiplexer M1 is changed, the first multiplexer M1 transmits the turn-on request signal ON_REQ to at least one of clock components of a selected clock path in operation S412 to turn on the clock components of the selected clock path. In other words, the first multiplexer M1 transmits the turn-on request signal ON_REQ to a higher node, i.e., the third multiplexer M3 in the selected clock path in operation S412.

The third multiplexer M3 transmits the turn-on request signal ON_REQ to the next higher node, i.e., the first divider DIV1 in operation S414. The first divider DIV1 transmits the turn-on request signal ON_REQ to the next higher node, i.e., the fourth multiplexer M4 in operation S416. The fourth multiplexer M4 transmits the turn-on request signal ON_REQ to the next higher node, i.e., the fifth multiplexer M5 in operation S418. The fifth multiplexer M5 transmits the turn-on request signal ON_REQ to the next higher node, i.e., the sixth multiplexer M6 in operation S420. The sixth multiplexer M6 transmits the turn-on request signal ON_REQ to the next higher node, i.e., the second PLL PLL2 in operation S422.

Since the second PLL PLL2 has no higher node, that is, the second PLL PLL2 is the highest node; the second PLL PLL2 is turned on or enabled in response to the turn-on request signal ON_REQ in operation S424, and sends the turn-on acknowledgement signal ON_ACK to its lower node, i.e., the sixth multiplexer M6 in operation S426. The sixth multiplexer M6 is turned on or enabled in response to the turn-on acknowledgement signal ON_ACK from the second PLL PLL2 in operation S428, and transmits the turn-on acknowledgement signal ON_ACK to the lower node, i.e., the fifth multiplexer M5 in operation S430.

The fifth multiplexer M5 is turned on or enabled in response to the turn-on acknowledgement signal ON_ACK from the sixth multiplexer M6 in operation S432, and transmits the turn-on acknowledgement signal ON_ACK to the lower node, i.e., the fourth multiplexer M4 in operation S434. The fourth multiplexer M4 is turned on or enabled in response to the turn-on acknowledgement signal ON_ACK from the fifth multiplexer M5 in operation S436, and transmits the turn-on acknowledgement signal ON_ACK to the lower node, i.e., the first divider DIV1 in operation S438.

The first divider DIV1 is turned on or enabled in response to the turn-on acknowledgement signal ON_ACK from the fourth multiplexer M4 in operation S440, and transmits the turn-on acknowledgement signal ON_ACK to the lower node, i.e., the third multiplexer M3 in operation S442. The third multiplexer M3 is turned on or enabled in response to the turn-on acknowledgement signal ON_ACK from the first divider DIV1 in operation S444, and transmits the turn-on acknowledgement signal ON_ACK to the lower node, i.e., the first multiplexer M1 in operation S446.

Meanwhile, when the selection of the first multiplexer M1 is changed, the first multiplexer M1 sends the turn-off request signal OFF_REQ to at least one of clock components of an old clock path in operation S452 to turn off the clock components of the old clock path. In other words, the first multiplexer M1 sends the turn-off request signal OFF_REQ to the second multiplexer M2 in operation S452.

The second multiplexer M2 transmits the turn-off request signal OFF_REQ to the higher node, i.e., the first PLL PLL1 in operation S454. Since the first PLL PLL1 has no higher node, it is turned off or disabled in response to the turn-off request signal OFF_REQ from the second multiplexer M2 in operation S456 and sends the turn-off acknowledgement signal OFF_ACK to the lower node, i.e., the second multiplexer M2 in operation S458. The second multiplexer M2 is turned off or disabled in response to the turn-off acknowledgement signal OFF_ACK from the first PLL PLL1 in operation S460 and transmits the turn-off acknowledgement signal OFF_ACK to the lower node, i.e., the first multiplexer M1 in operation S462.

A procedure for turning off the clock components of the old clock path in operation S452 through S462 may be performed in parallel or simultaneously with a procedure for turning on the clock components of the newly selected clock path in operations S412 through S446. The sequence of the procedure for turning off the clock components of the old clock path in operation S452 through S462 in example embodiments illustrated in FIG. 7 is the same as that of a procedure for turning on the clock components according to the initial selection (i.e., "0") of the first multiplexer M1 in operations S310 through S360 in the embodiments illustrated in FIG. 6 except for the types of signals.

Figure 8:
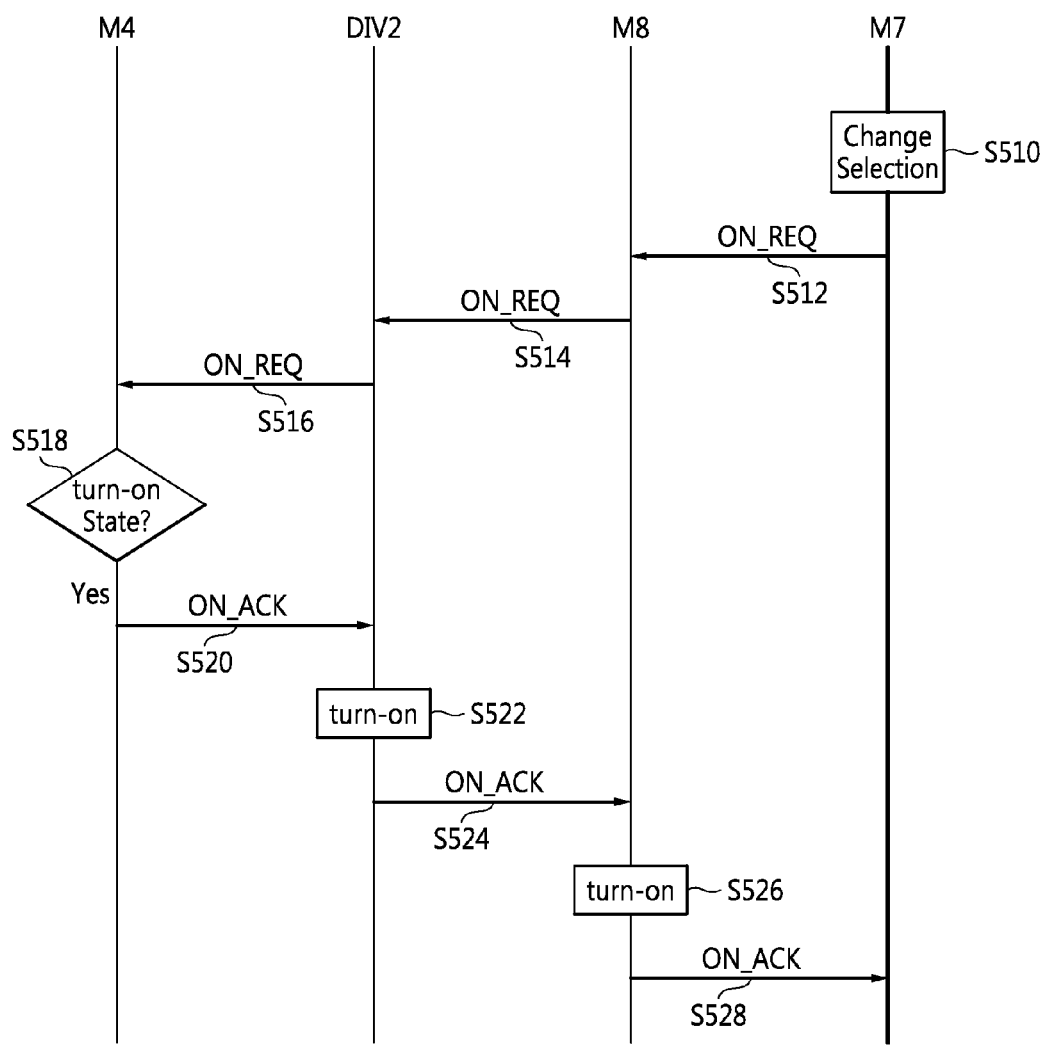

The operation of the clock circuit 10B in case where the setting of the seventh multiplexer M7 is changed from "0" to "1" is illustrated in FIG. 8. Referring to FIGS. 5 and 8, when a selection signal S7 of the seventh multiplexer M7 is changed from "0" to "1", the selection of the seventh multiplexer M7 is changed in operation S510.

When the selection of the seventh multiplexer M7 is changed, the seventh multiplexer M7 transmits the turn-on request signal ON_REQ to at least one of clock components of a newly selected clock path in operation S512 to turn on the clock components of the selected clock path. In other words, the seventh multiplexer M7 transmits the turn-on request signal ON_REQ to its higher node, i.e., the eighth multiplexer M8 in the selected clock path in operation S512.

The eighth multiplexer M8 transmits the turn-on request signal ON_REQ to the next higher node, i.e., the second divider DIV2 in operation S514. The second divider DIV2 transmits the turn-on request signal ON_REQ to the next higher node, i.e., the fourth multiplexer M4 in operation S516.

It is assumed that the fourth multiplexer M4 has already been turned on as one of the higher nodes than the first multiplexer M1 in the procedure illustrated in FIG. 7. In this case, the state of the fourth multiplexer M4 is the turn-on state and the state information of the fourth multiplexer M4 has been stored in a state register thereof. In addition, the higher nodes than the fourth multiplexer M4, i.e., the fifth multiplexer M5, the sixth multiplexer M6, and the second PLL PLL2 have also already been turned on.

The fourth multiplexer M4 checks its state register in operation S518. When the turn-on state is detected (in case of YES) in operation S518, the fourth multiplexer M4 does not transmit the turn-on request signal ON_REQ to the higher node but sends the turn-on acknowledgement signal ON_ACK to the lower node, i.e., the second divider DIV2 in operation S520.

The second divider DIV2 is turned on or enabled in response to the turn-on acknowledgement signal ON_ACK from the fourth multiplexer M4 in operation S522, and transmits the turn-on acknowledgement signal ON_ACK to the lower node, i.e., the eighth multiplexer M8 in operation S524. The eighth multiplexer M8 is turned on or enabled in response to the turn-on acknowledgement signal ON_ACK from the second divider DIV2 in operation S526, and transmits the turn-on acknowledgement signal ON_ACK to the lower node, i.e., the seventh multiplexer M7 in operation S528.

Figure 9:
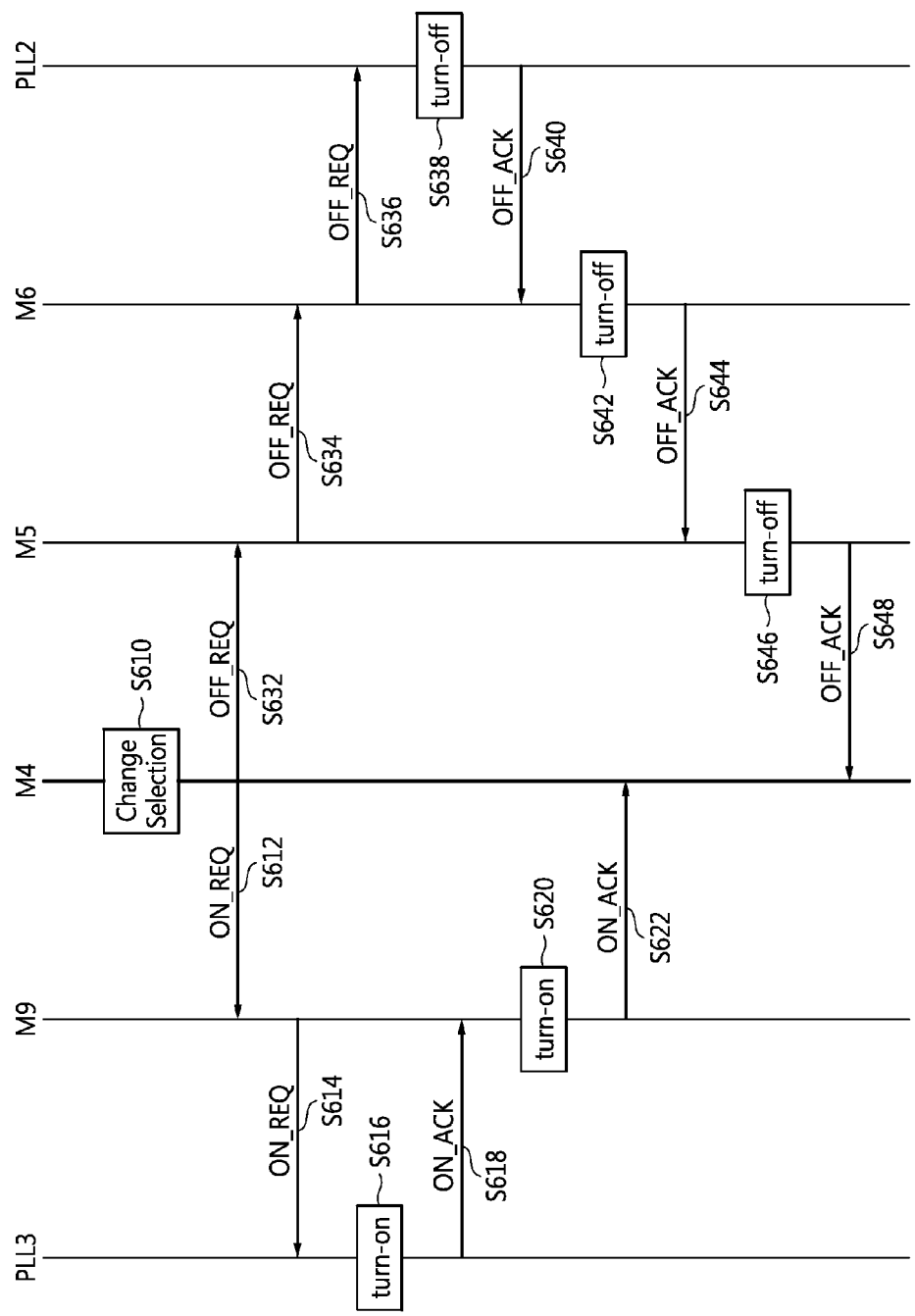

The operation of the clock circuit 10B in case where the setting of the fourth multiplexer M4 is changed from "0" to "1" is illustrated in FIG. 9. Referring to FIGS. 5 and 9, when a selection signal S4 of the fourth multiplexer M4 is changed from "0" to "1", the selection of the fourth multiplexer M4 is changed in operation S610.

When the selection of the fourth multiplexer M4 is changed, the fourth multiplexer M4 transmits the turn-on request signal ON_REQ to at least one of clock components of a newly selected clock path in operation S612 to turn on the clock components of the selected clock path. In other words, the fourth multiplexer M4 transmits the turn-on request signal ON_REQ to its higher node, i.e., the ninth multiplexer M9 in the selected clock path in operation S612.

The ninth multiplexer M9 transmits the turn-on request signal ON_REQ to the higher node, i.e., the third PLL PLL3 in operation S614. Since the third PLL PLL3 has no higher node, that is the third PLL PLL3 is the highest node; it is turned on or enabled in response to the turn-on request signal ON_REQ in operation S616, and sends the turn-on acknowledgement signal ON_ACK to the lower node, i.e., the ninth multiplexer M9 in operation S618.

The ninth multiplexer M9 is turned on or enabled in response to the turn-on acknowledgement signal ON_ACK from the third PLL PLL3 in operation S620, and transmits the turn-on acknowledgement signal ON_ACK to the lower node, i.e., the fourth multiplexer M4 in operation S622.

Meanwhile, when the selection of the fourth multiplexer M4 is changed, the fourth multiplexer M4 sends the turn-off request signal OFF_REQ to at least one of clock components of an old clock path in operation S632 to turn off the clock components of the old clock path. In other words, the fourth multiplexer M4 sends the turn-off request signal OFF_REQ to the fifth multiplexer M5 in operation S632.

The fifth multiplexer M5 transmits the turn-off request signal OFF_REQ to the higher node, i.e., the sixth multiplexer M6 in operation S634. The sixth multiplexer M6 transmits the turn-off request signal OFF_REQ to the higher node, i.e., the second PLL PLL2 in operation S636.

Since the second PLL PLL2 has no higher node, it is turned off or disabled in response to the turn-off request signal OFF_REQ from the sixth multiplexer M6 in operation S638, and sends the turn-off acknowledgement signal OFF_ACK to the lower node, i.e., the sixth multiplexer M6 in operation S640. The sixth multiplexer M6 is turned off or disabled in response to the turn-off acknowledgement signal OFF_ACK from the second PLL PLL2 in operation S642, and transmits the turn-off acknowledgement signal OFF_ACK to the lower node, i.e., the fifth multiplexer M5 in operation S644. The fifth multiplexer M5 is turned off or disabled in response to the turn-off acknowledgement signal OFF_ACK from the sixth multiplexer M6 in operation S646, and transmits the turn-off acknowledgement signal OFF_ACK to the lower node, i.e., the fourth multiplexer M4 in operation S648.

A procedure for turning off the clock components of the old clock path in operation S632 through S648 may be performed in parallel or simultaneously with a procedure for turning on the clock components of the newly selected clock path in operations S612 through S622. The sequence of the procedure for turning off the clock components of the old clock path in operation S632 through S648 in example embodiments illustrated in FIG. 9 is the same as that of part (i.e., operations S418 through S434) of the procedure for turning on the clock components in operations S412 through S446 in the embodiments illustrated in FIG. 7 except for the types of signals.

As described above, according to at least one example embodiment of the inventive concepts, when selection is change in a selector (e.g., a multiplexer), a turn-on request signal is transmitted to a newly selected clock path and a turn-off request signal is transmitted to an old clock path that has been selected before but is not selected at present. When there are three or more clock signals that can be selected in a selector, that is, when a selector has three or more inputs;

there exists a clock path that has neither been selected before nor selected at present and the selector does not send any request signal to such clock path.

A clock circuit may also include a control register (not shown) according to at least one example embodiment of the inventive concepts. A user may be allowed to set either a manual control mode or an automatic control mode in the control register. The manual control mode is an operation of manually controlling or setting each of clock components of each clock path in a clock circuit in the same manner as a conventional clock circuit. The automatic control mode is an operation of automatically controlling or setting each clock component of a clock path according to the selection of a selector in the same manner as described with reference to FIGS. 1 through 9 above.

Figure 10:
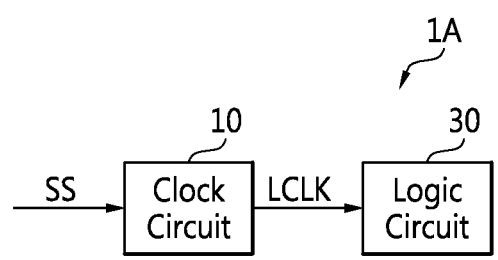
FIG. 10 is a schematic block diagram of a semiconductor integrated circuit (IC) device including a clock circuit according to at least one example embodiment of the inventive concepts.

FIG. 10 is a schematic block diagram of a semiconductor integrated circuit (IC) device 1A including the clock circuit 10 according to at least one example embodiment of the inventive concepts. Referring to FIGS. 1 through 10, the semiconductor IC device 1A includes the clock circuit 10 and a logic circuit 30.

The clock circuit 10 may be a clock circuit as illustrated in FIG. 1, 2, or 5. The clock circuit 10 may receive a source clock signal SS and may output an output clock signal LCLK. The output clock signal LCLK may be the selection clock signal SCLK illustrated in FIG. 1 or 2. The logic circuit 30 may receive the output clock signal LCLK from the clock circuit 10 and may operate according to the output clock signal LCLK.

Figure 11:
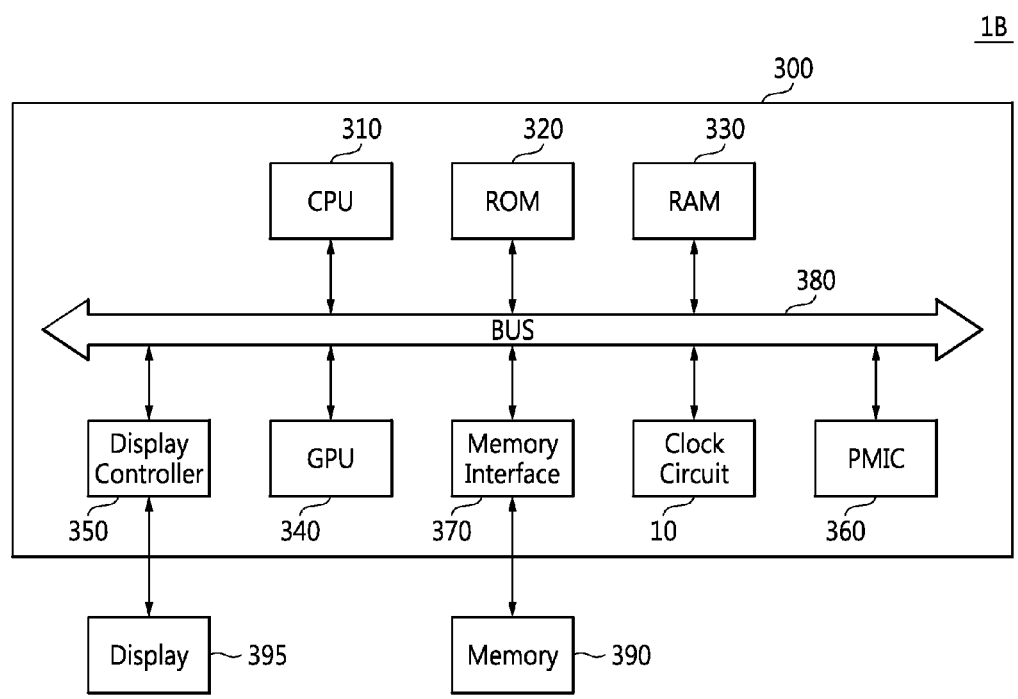
FIG. 11 is a schematic block diagram of a semiconductor IC device including a clock circuit according to at least one example embodiment of the inventive concepts.

FIG. 11 is a schematic block diagram of a semiconductor IC device 1B including the clock circuit 10 according to at least one example embodiment of the inventive concepts. Referring to FIG. 11, the semiconductor IC device 1B may be implemented as a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, or an e(electronic)-book device.

The semiconductor IC device 1B may include a SoC 300, a memory device 390, and a display 395.

The SoC 300 may include a central processing unit (CPU) 310, a read-only memory (ROM) 320, a random access memory (RAM) 330, a graphics processing unit (GPU) 340, the clock circuit 10, a display controller 350, a memory interface 370, and a bus 380. The SoC 300 may also include a power management IC (PMIC) 360. The SoC 300 may also include components other than those illustrated in FIG. 11. The PMIC 360 is implemented within the SoC 300 in the embodiments illustrated in FIG. 11, but the PMIC 360 may be implemented outside the SoC 300 in other embodiments.

The CPU 310, which may be referred to as a processor, may process or execute programs and/or data stored in the memory device 390. For instance, the CPU 310 may process or execute the programs and/or the data in response to a clock signal output from the clock circuit 10.

The CPU 310 may be implemented as a multi-core processor. The multi-core processor is a single computing component with two or more independent actual processors (referred to as cores). Each of the processors reads and executes program instructions. The multi-core processor is able to drive a plurality of accelerators simultaneously, so that a data processing system including the multi-core processor is able to perform multi-acceleration.

The programs and/or the data stored in the ROM 320, the RAM 330, and/or the memory 390 may be loaded to a memory included in the CPU 310 when necessary. The ROM 320 may store permanent programs and/or data. The ROM 320 may be implemented as erasable programmable ROM (EPROM) or electrically erasable programmable ROM (EEPROM).

The RAM 330 may temporarily store programs, data, or instructions. The programs and/or data stored in the memory 390 may be temporarily stored in the RAM 330 according to the control of the CPU 310 or a booting code stored in the ROM 320. The RAM 330 may be dynamic RAM (DRAM) or static RAM (SRAM).

The GPU 340 processes data read by the memory interface 370 from the memory 390 into a signal suitable to be displayed.

The clock circuit 10 may be a clock circuit as illustrated in FIG. 1, 2, or 5. The clock circuit 10 may provide a clock signal for other modules, i.e., the CPU 310, the ROM 320, the RAM 330, the GPU 340, the display controller 350, and memory interface 370 in the SoC 300. Although the clock circuit 10 is illustrated as a single module in FIG. 11, the clock circuit 10 may be implemented in two or more modules in a distributed manner in other example embodiments. The clock circuit 10 may be implemented in the other modules, i.e., CPU 310, the ROM 320, the RAM 330, the GPU 340, the display controller 350, and memory interface 370 in the SoC 300 in a distributed manner.

The memory interface 370 interfaces with the memory device 390. The memory interface 370 controls the overall operation of the memory device 390 and controls data exchange between a host and the memory device 390. For instance, the memory interface 370 writes data to the memory device 390 or reads data from the memory device 390 at the request of the host. Here, the host may be a processing unit such as the CPU 310, the GPU 340, or the display controller 350.

The memory device 390 is a storage medium for storing data and it may store an operating system (OS) and various kinds of programs and/or data. The memory device 390 may be DRAM, but the inventive concept is not restricted to the current embodiments. For instance, the memory device 390 may be non-volatile memory such as flash memory, phase-change RAM (PRAM), magnetoresistive RAM (MRAM), resistive RAM (ReRAM) or ferroelectric RAM (FeRAM). In other example embodiments, the memory device 390 may be an embedded memory provided within the SoC 300. The components 310, 320, 330, 340, 350, and 370 may communicate with one another through the bus 380.

The display 395 may display image signals output from the display controller 350. The display 395 may be implemented as a liquid crystal display (LCD), a light emitting diode (LED) display, an organic LED (OLED) display, or an active-matrix OLED (AMOLED) display. The display controller 350 controls the operation of the display 395.

Figure 12:
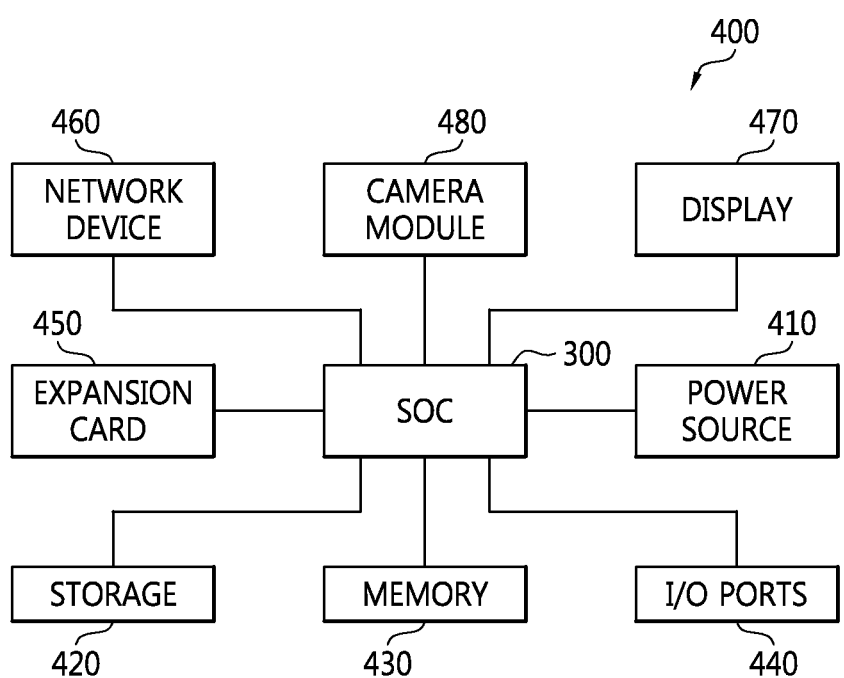
FIG. 12 is a block diagram of an electronic system including the SoC according to at least one example embodiment of the inventive concepts.

FIG. 12 is a block diagram of an electronic system 400 including the SoC according to at least one example embodiment of the inventive concepts. Referring to FIG. 12, the electronic system 400 may be implemented as a PC, a data server, a laptop computer or a portable device. The portable device may be a cellular phone, a smart phone, a tablet personal computer (PC), a personal digital assistant (PDA), an enterprise digital assistant (EDA), a digital still camera, a digital video camera, a portable multimedia player (PMP), portable navigation device(PDN), a handheld game console, or an e(electronic)-book device.

The electronic system 400 includes the SoC 300, a power source 410, a storage device 420, a memory 430, I/O ports 440, an expansion card 450, a network device 460, and a display 470. The electronic system 400 may further include a camera module 480.

The SoC 300 corresponds to the SoC 300 illustrated in FIG. 11. The SoC 300 may control the operation of at least one of the elements 410 through 480. The power source 410 may supply an operating voltage to at least one of the elements 300, and 420 through 480. The storage device 420 may be implemented by a hard disk drive (HDD) or a solid state drive (SSD).

The memory 430 may be implemented by a volatile or non-volatile memory. The memory 430 may correspond to the memory 390 illustrated in FIG. 11. A memory interface 370 (shown in FIG. 11) that controls a data access operation, e.g., a read operation, a write operation (or a program operation), or an erase operation, on the memory 430 may be integrated into or embedded in the SoC 300. Alternatively, the memory interface may be provided between the SoC 300 and the memory 430.

The I/O ports 440 are ports that receive data transmitted to the electronic system 400 or transmit data from the electronic system 400 to an external device. For instance, the I/O ports 440 may include a port connecting with a pointing device such as a computer mouse, a port connecting with a printer, and a port connecting with a USB drive.

The expansion card 450 may be implemented as a secure digital (SD) card or a multimedia card (MMC). The expansion card 450 may be a subscriber identity module (SIM) card or a universal SIM (USIM) card.

The network device 460 enables the electronic system 400 to be connected with a wired or wireless network. The display 470 displays data output from the storage device 420, the memory 430, the I/O ports 440, the expansion card 450, or the network device 460.

The camera module 480 converts optical images into electrical images. Accordingly, the electrical images output from the camera module 480 may be stored in the storage module 320, the memory 430, or the expansion card 450. Also, the electrical images output from the camera module 480 may be displayed through the display 470.

As described above, according to at least one example embodiment of the inventive concepts, components of a selected clock path are automatically turned on while components of an unselected clock path are turned off. Accordingly, when a clock signal is changed, an inconvenience of individually controlling all components of a clock path is avoided and changing the clock signal becomes easy.

While the inventive concepts have been particularly shown and described with reference to example embodiments thereof, it will be understood by those of ordinary skill in the art that various changes in forms and details may be made therein without departing from the spirit and scope of the inventive concepts as defined by the following claims.

What is claimed is:

1. A clock circuit for generating a clock signal, the clock circuit comprising:
    a first clock generator configured to generate a first clock signal;
    a second clock generator configured to generate a second clock signal; and
    a selector connected to the first clock generator and the second clock generator, the selector configured to,
        select one of the first and second clock signals as a selected clock signal based on a selection signal, and
        transmit, if a selection of the selector changes from the second clock signal to the first clock signal, a turn-on request signal to at least one first component to enable the at least one first component, the at least one first component configured to send a turn-on acknowledgement signal to the selector in response to the turn-on request signal, the first clock generator including the at least one first component,
    wherein the selector is configured to transmit a turn-off request signal to at least one second component to disable the at least one second component and to send a turn-off acknowledgement signal to the selector, the second clock generator including the at least one second component.

2. The clock circuit of claim 1, wherein the at least one second component comprises:
    a first clock component configured to receive a first input clock signal and to transmit the second clock signal to the selector as the selected clock signal; and
    a second clock component configured to receive a second input clock signal and to transmit the third clock signal to the first clock component,
    wherein,
        the first clock component is configured to transmit the turn-off request signal to the second clock component in response to the turn-off request signal from the selector,
        the second clock component is disabled in response to the turn-off request signal from the first clock component and is configured to send the turn-off acknowledgement signal to the first clock component, and
        the first clock component is disabled in response to the turn-off acknowledgement signal from the second clock component and configured to transmit the turn-off acknowledgement signal to the selector.

3. The clock circuit of claim 1, wherein the at least one first component comprises:
    a first clock component configured to receive a first input clock signal and to transmit the first clock signal to the selector as the selected clock signal; and
    a second clock component configured to receive a second input clock signal and to transmit the first clock signal to the first clock component.

4. The clock circuit of claim 3, wherein,
    the first clock component is configured to transmit the turn-on request signal to the second clock component in response to the turn-on request signal from the selector to i) enable the second clock component, and to cause the second clock component to transmit the turn-on acknowledgement signal to the first clock component, and
    the first clock component is enabled in response to the turn-on acknowledgement signal from the second clock component and configured to transmit the turn-on acknowledgement signal to the selector.

5. The clock circuit of claim 3, wherein if a selection of the selector is changed from the first clock generator to the second clock generator,
    the selector is configured to transmit the turn-off request signal to the first clock component,
    the first clock component is configured to transmit the turn-off request signal to the second clock component in response to the turn-off request signal from the selector,
    the second clock component is disabled in response to the turn-off request signal from the first clock component and configured to send the turn-off acknowledgement signal to the first clock component, and the first clock component is disabled in response to the turn-off acknowledgement signal from the second clock component and configured to transmit the turn-off acknowledgement signal to the selector.

6. The clock circuit of claim 3, wherein the first clock component comprises a parameter setting register and a value set in the parameter setting register is applied if the first clock component is turned on.

7. The clock circuit of claim 3, wherein each of the first and second clock components comprises a state register configured to store state information of an associated clock component.

8. The clock circuit of claim 3, wherein,
the first clock component is configured to not transmit the turn-on request signal to the second clock component and transmit the turn-on acknowledgement signal to the selector if i) state information of a state register comprised in the first clock component indicates a turn-on state, and the first clock component receives the turn-on request signal from the selector,
the first clock component is configured to transmit the turn-on request signal to the second clock component if i) the state information of the state register indicates a turn-off state, and ii) the first clock component receives the turn-on request signal from the selector,
the second clock component is enabled in response to the turn-on request signal from the first clock component of the first clock generator, configured store the turn-on state as the state information of a respective state register, and configured to transmit the turn-on acknowledgement signal to the first clock component of the first clock generator; and
the first clock component is enabled in response to the turn-on acknowledgement signal from the second clock component, configured to store the turn-on state as the state information of a respective state register, and configured to transmit the turn-on acknowledgement signal to the selector.

9. The clock circuit of claim 3, wherein each of the first and second clock components comprises:
a first port configured to receive the turn-on request signal and the turn-off request signal; and
a second port configured to receive the turn-on acknowledgement signal and the turn-off acknowledgement signal.

10. The clock circuit of claim 3, wherein each of the first and second clock components comprises:
a first port and a second port configured to receive the turn-on request signal and the turn-off request signal, respectively; and
a third port and a fourth port configured to receive the turn-on acknowledgement signal and the turn-off acknowledgement signal, respectively.

11. The clock circuit of claim 1, wherein
the at least one first component included in the first clock generator includes a plurality of first components, the first components including,
a lowest first component directly connected to the selector, and
a highest first component electrically connected to the lowest first component, being farthest from the selector, and being closest to the first clock generator; and
the selector is configured to,
transmit the turn-on request signal to only the lowest first component, and
receive the turn-on acknowledgement signal from only the lowest first component.

12. The clock circuit of claim 11, wherein one of the first components receiving the turn-on request signal is configured to transmit the turn-on request signal to a next higher one of the first components until the turn-on request signal reaches the highest first component.

13. A semiconductor integrated circuit device comprising:
a clock circuit configured to receive a source clock signal and to generate an output clock signal; and
a logic circuit configured to operate in response to the output clock signal,
wherein the clock circuit includes,
a first clock generator configured to generate a first clock signal,
a second clock generator configured to generate a second clock signal, and
a selector connected to the first clock generator and the second clock generator, the selector configured to,
select one of the first clock signal and the second clock signal as the output clock signal based on a selection signal, and
transmit, if a selection of the selector changes from the second clock signal to the first clock signal,
a turn-on request signal to at least one clock component of the first clock generator to enable the first clock generator, and
a turn-off request signal to at least one clock component of the second clock generator to disable the second clock generator,
wherein the at least one clock component of the first clock generator is configured to receive the turn-on request signal from a clock component at a lower node and transmit the turn-on request signal to a clock component at a higher node.

14. The semiconductor integrated circuit device of claim 13, wherein the at least one clock component of the second clock generator is configured to receive the turn-off request signal from a clock component at a lower node and transmit the turn-off request signal to a clock component at a higher node.

15. The semiconductor integrated circuit device of claim 14, wherein each of the at least one clock components in each of the first and second clock generators comprises a state register configured to store state information of an associated clock component.

16. A clock circuit, comprising:
a selector configured to,
send a first request signal and a second request signal, the first request signal requesting activation of first clock components associated with a selected clock generator, and the second request signal requesting deactivation of second clock components associated with an unselected clock generator, and
receive a first acknowledgement signal and a second acknowledgement signal, the first acknowledgement signal verifying activation of the first clock components, and the second acknowledgement signal verifying deactivation of the second clock components.

17. The clock circuit of claim 16, wherein the selector is configured to send the first and second request signals in response to receiving a request to change clock signals.

18. The clock circuit of claim 16, wherein the selector includes,
a first port configured to send the first and second request signals,
a second port configured to receive the first and second acknowledgement signals, and a third port configured to output a clock signal generated by the selected clock generator.

19. The clock circuit of claim 16, wherein the selector is configured to send the first and second request signals at a substantially same time.

20. The clock circuit of claim 16, wherein the selector is configured to,
- receive the first acknowledgement signal after the first request signal reaches a clock component at a highest node in the first clock components, and
- receive the second acknowledgement signal after the second request signal reaches a clock component at a highest node in the second clock components.

* * * * *